(12) United States Patent
Vig et al.

(10) Patent No.: US 7,409,162 B2
(45) Date of Patent: *Aug. 5, 2008

(54) TIMING ERROR REDUCTION IN QKD SYSTEMS

(75) Inventors: Harry Vig, N. Billerica, MA (US); Alexei Trifonov, Boston, MA (US)

(73) Assignee: MagiQ Technologies, Inc, New York, NY (US)

( * ) Notice: Subject to any disclaimer, the term of this patent is extended or adjusted under 35 U.S.C. 154(b) by 562 days.

This patent is subject to a terminal disclaimer.

(21) Appl. No.: 10/969,813

(22) Filed: Oct. 20, 2004

(65) Prior Publication Data

US 2006/0034615 A1    Feb. 16, 2006

Related U.S. Application Data

(60) Provisional application No. 60/601,906, filed on Aug. 16, 2004, provisional application No. 60/515,969, filed on Oct. 30, 2003.

(51) Int. Cl.
*H04B 10/00* (2006.01)
*G06F 1/04* (2006.01)

(52) U.S. Cl. ...................... 398/154; 327/291
(58) Field of Classification Search ................. 398/154; 327/291–305, 141–163; 375/371–376
See application file for complete search history.

(56) References Cited

U.S. PATENT DOCUMENTS

| | | | |
|---|---|---|---|
| 4,730,347 A * | 3/1988 | Paul | ............................ 375/371 |
| 5,307,410 A | 4/1994 | Bennett | |
| 5,675,648 A | 10/1997 | Townsend | |
| 6,438,234 B1 | 8/2002 | Gisin et al. | |
| 6,594,279 B1 * | 7/2003 | Nguyen et al. | ............... 370/468 |
| 7,197,053 B1 * | 3/2007 | Liu et al. | ..................... 370/503 |
| 7,233,187 B2 * | 6/2007 | Vig | .............................. 327/291 |
| 2003/0231771 A1 | 12/2003 | Gisin et al. | |
| 2004/0201425 A1 * | 10/2004 | Lesso | ......................... 331/1 A |
| 2004/0233935 A1 * | 11/2004 | Yuan et al. | .................... 370/474 |
| 2005/0083098 A1 * | 4/2005 | Matsui et al. | ................ 327/291 |

OTHER PUBLICATIONS

Ribordy et al, "Automated 'plug and play' quantum key distribution system," elec. lett. Oct. 29, 1998 vol. 34 No. 22 pp. 2116-2117.

* cited by examiner

*Primary Examiner*—Jason Chan
*Assistant Examiner*—Quan-Zhen Wang
(74) *Attorney, Agent, or Firm*—Opticus IP Law PLLC

(57) ABSTRACT

Systems and methods for reducing or eliminating timing errors in a quantum key distribution (QKD) system (100) are disclosed. The QKD system has a pulse generator with retimer (PGRT) that includes a field-programmable gate array (FPGA) (or FPGA output) which is used as a timing generator (TG). While an FPGA has the desired degree of programmability for use in a QKD system, it also suffers from undue amounts of jitter in the digital output. The present invention utilizes emitter-coupled logic (ECL) to reduce the timing jitter from the FPGA by coupling two ECL delays (ECL delay 1 and ECL delay 2) to the FPGA and to retiming block, and by using an ECL logical AND gate to set the pulse width of the various synchronization signals. An embodiment of the present invention includes multiple clock domains having individual clocks (CLK), phase-lock loops (PLLs), retiming circuits (RT) and timing generators (TG) for robust jitter reduction and hence highly accurate QKD system timing.

11 Claims, 6 Drawing Sheets

TIMING ERROR REDUCTION IN QKD SYSTEMS

RELATED APPLICATIONS

This application claims priority under 35 USC §119(e) from U.S. Provisional Patent Application Ser. No. 60/515,969, filed on Oct. 30, 2003.

The present invention is related to U.S. Provisional Patent Application Ser. No. 60/601,906, filed on Aug. 26, 2004.

FIELD OF THE INVENTION

The present invention relates to quantum cryptography, and in particular relates to apparatus and methods for reducing timing errors in quantum key distribution (QKD) systems.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system of an unknown state will modify its state. As a consequence, an eavesdropper ("Eve") that attempts to intercept or otherwise measure the quantum signal will introduce errors into the transmitted signals. The resulting errors end up revealing Eve's presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). A specific QKD system is described in U.S. Pat. No. 5,307,410 to Bennett (the '410 patent), which patent is incorporated herein by reference.

The Bennett-Brassard article and the '410 patent each describe a so-called "one-way" QKD system wherein Alice randomly encodes the polarization of single photons, and Bob randomly measures the polarization of the photons. The one-way system described in the '410 patent is based on a two-part optical fiber Mach-Zehnder interferometer. Respective parts of the interferometer are accessible by Alice and Bob so that each can control the phase of the interferometer.

QKD systems include an "optics layer" having one or more optical circuits and an electronics layer having one or more electronic circuits. Proper operation of the QKD system requires precise and repeatable timing, which involves making sure that electrical signals in the electrical circuits are at the correct values when the quantum signal (photon) is at particular point in the optical circuit. FIG. 1A is a schematic diagram of a generalized prior art two-way QKD system 10A, such as disclosed in U.S. Pat. No. 6,438,234, showing a number of elements critical to the timed operation of the system. Those elements not critical to the timing operation of the system have been omitted for the sake of illustration. The optical paths are indicated by dark lines and the electrical paths are indicated by lighter lines.

FIG. 1B is a schematic diagram of a generalized prior art one-way QKD system 10, such as disclosed in U.S. Pat. No. 5,675,648, showing a number of elements critical to the timed operation of the system. Those elements not critical to the timing operation of the system have been omitted for the sake of illustration. The optical paths for single photons are indicated by dark lines and the electrical paths are indicated by lighter lines.

QKD system 10A of FIG. 1A includes a laser source LS optically coupled to a modulator M1 via an optical fiber section F1, and a modulator M2 optically coupled to modulator M1 via an optical fiber section F2. Modulator M1 is optically coupled to two single-photon detectors SPD1 and SPD2 via respective optical fiber sections F3 and F4. Laser source LS is electrically coupled to a timing generator TG that controls the timing of the emission of a light pulse LP. A clock CLK is electrically coupled to timing generator TG to provide a clock signal for system timing. System 10 also includes two discriminators D1 and D2, where discriminator D1 is coupled to detector SPD1 and to timing generator TG, and discriminator D2 is coupled to detector SPD2 and to the timing generator.

In the operation of system 10A, clock CLK provides a clock signal S1 to timing generator TG to serve as a timing reference. Timing generator TG then generates a timed signal S2 to laser source LS to initiate the activation of laser source LS to emit light pulse LP. Timing generator TG also generates a first modulator signal S3 timed to activate modulator M1 when light pulse LP is passing therethrough. Likewise, timing generator generates a second modulator signal S4 timed to activate modulator M2 when light pulse LP is passing therethrough.

In addition, timing generator TG generates detector signals S5 and S6 to SPD1 and SPD2, respectively, and corresponding signals S7 and S8 to discriminators D1 and D2, respectively. The detector signals S5 and S6 are timed to activate detectors SPD1 and SPD2 at the expected arrival time of light pulse LP at one of the detectors (the arrival of light pulse LP at one of the detectors depends on the modulation imparted to the light pulse LP). In response to a detection event ("click"), SPD1 and SPD2 generate respective SPD signals S9 and S10 that are sent to discriminators D1 and D2, respectively. The discriminator signals S7 and S8 are timed to correspond to SPD signals S9 and S10 to discriminate against detection events other than those caused by the expected arrival of modulated light pulse LP.

The operation of system 10B of FIG. 1B is similar to the operation of system 10A, with two single-photon detectors SPD1 and SPD2 optically coupled to modulator M2.

In systems 10A and 10B, there is a finite time delay between the elements that varies due to, for example, the length of the optical path connecting the various optical elements, and the length of the electrical path (e.g., wires) connecting the various electrical elements.

Timing generator TG is an electrical circuit that includes an inherent amount of timing error. Timing generators that have the ability to generate the type of signals needed—whether they be a microprocessor, a digital signal processor (DSP), a field-programmable gate array (FPGA), an application-specific integrated circuit (ASIC), or other type of circuit—typically do not have as low a jitter as desired due to the type of logic families used, mostly CMOS and NMOS. While the best of these (FPGAs and ASICs) are good enough to use for classical telecommunications timing applications, they are not good enough for practical (e.g., commercial or non-laboratory) QKD systems. In practical QKD systems, variations in timing that would otherwise be acceptable in a classical telecommunications application are not acceptable in a QKD system because they result in unacceptably high error rates and potential security breaches.

Accordingly, there is a need for timing systems and methods for QKD systems that provide stricter limits on timing variations (e.g., jitter) than are presently used for classical telecommunication applications.

SUMMARY OF THE INVENTION

The present invention includes systems and methods for reducing or eliminating timing errors in a quantum key distribution (QKD) system (100) are disclosed. The QKD system has a pulse generator with retimer (PGRT) coupled to a field-programmable gate array (FPGA). The FPGA is programmed to operate as a timing generator (TG). The timing generator generates a digital timing signal (SF). While an FPGA has the desired degree of programmability for use in a QKD system, it also suffers from undue amounts of jitter in the digital output. Thus, the timing signal generated by the FPGA can cause timing errors. The present invention utilizes emitter-coupled logic (ECL) to reduce the timing jitter from the FPGA by coupling two ECL delays (ECL delay 1 and ECL delay 2) to the FPGA and to a retiming block (i.e., retimer RT), and by using an ECL logical AND gate to set the pulse width of the various synchronization signals sent to the various electrically controlled elements of the QKD system. An embodiment of the present invention includes a QKD system having multiple clock domains with individual clocks (CLK), phase-lock loops (PLLs), retiming circuits (RT) and timing generators (TG) for robust jitter reduction, and hence highly accurate QKD system timing.

DETAILED DESCRIPTION OF THE INVENTION

Figure 1A:
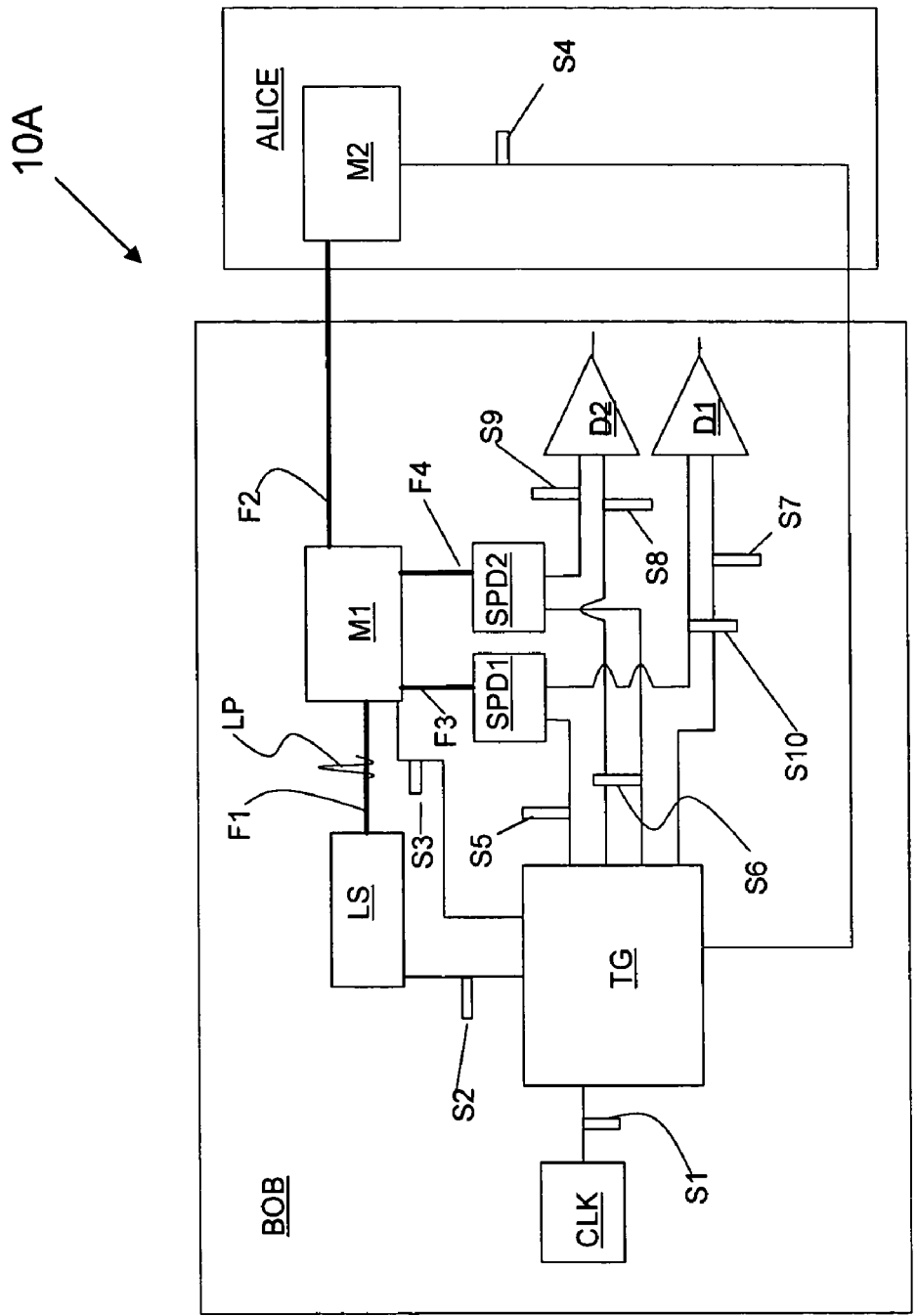
FIG. 1A is a schematic diagram of a generalized prior art two-way QKD system, wherein only those elements whose operation need to be timed for proper operation of the QKD system are shown for the sake of illustration.
Figure 1B:
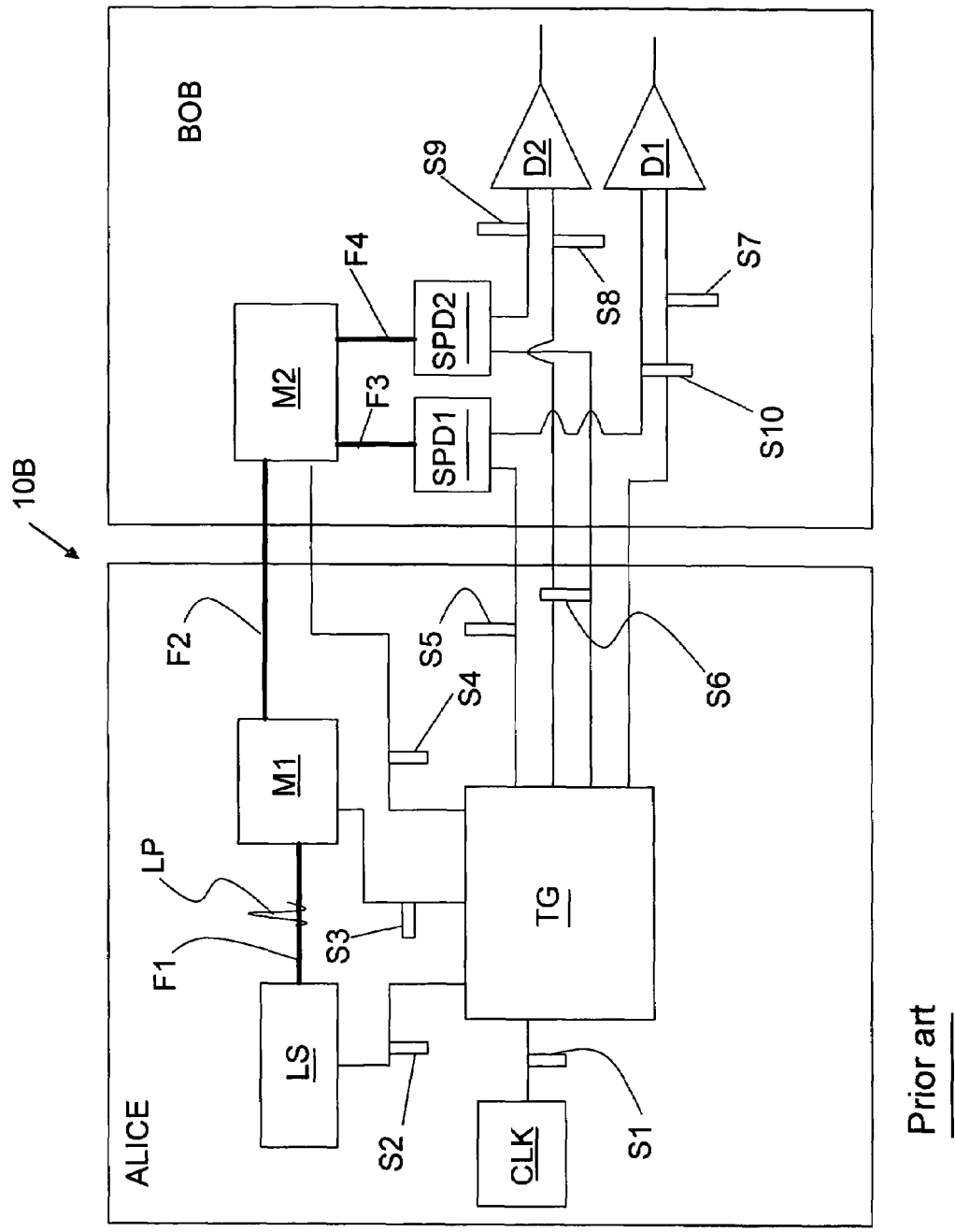
FIG. 1B is a schematic diagram of a generalized prior art one-way QKD system, wherein only those elements whose operation need to be timed for proper operation of the QKD system are shown for the sake of illustration.
Figure 2:
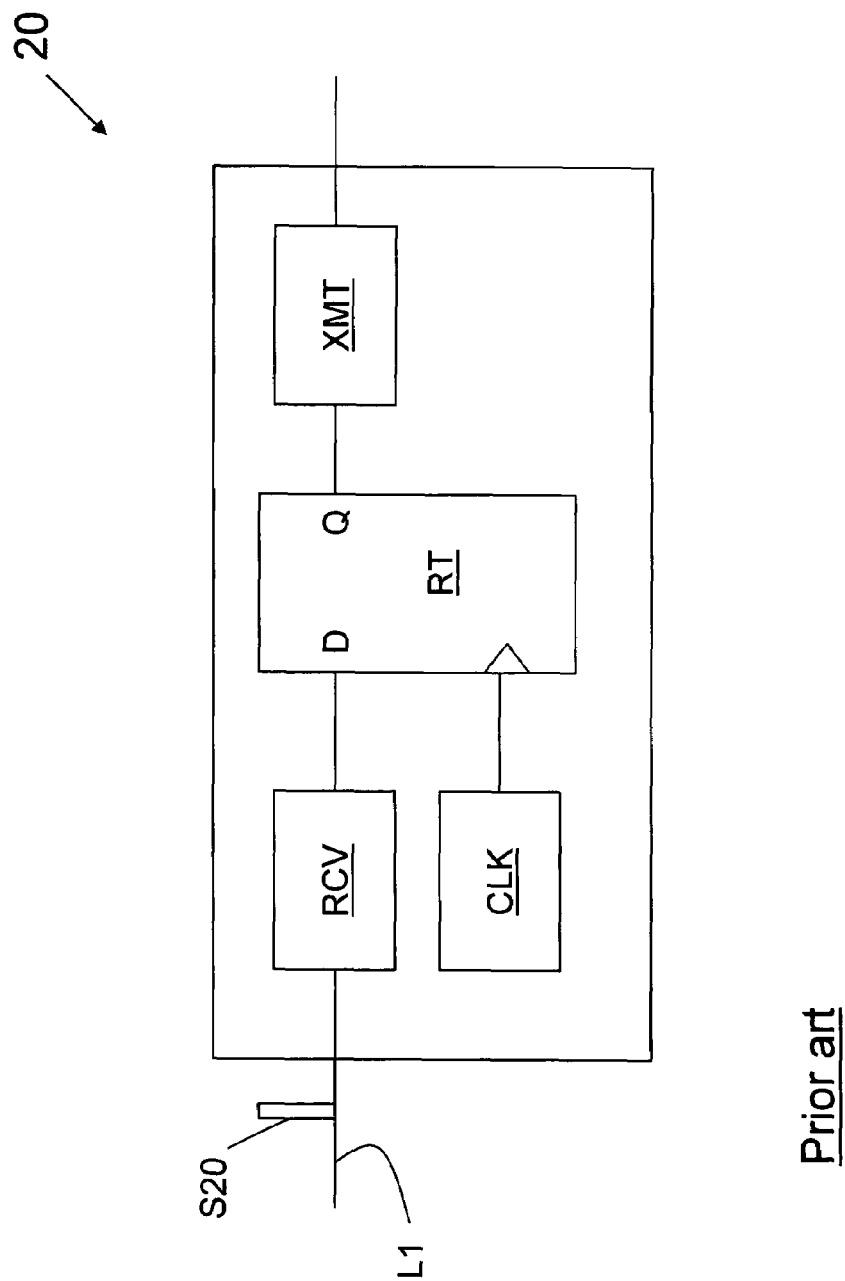
FIG. 2 is schematic diagram of a prior art retiming circuit used in classical telecommunications applications, and which includes a receiver, a clock, a retiming block, and a transmitter.

One approach to reducing timing jitter in a QKD system is to modify a retiming circuit previously used in the telecommunications industry to make it suitable for use in a QKD system. FIG. 2 is schematic diagram of a prior art retiming circuit 20 used in classical telecommunications. Circuit 20 includes a receiver RCV, a clock CLK, a retiming block RT, and a transmitter XMT. In circuit 20, the receiver RCV receives a weak electrical signal S20 from input line L1 that has timing jitter due to noise picked up along the transmission path.

If the transmitter XMT simply sent a copy of signal S20, it would pass on all the timing error in the form of a high transmitted jitter. The retiming block RT samples the receiver RCV at a time determined by its own low-jitter clock, and sends the transmitter XMT new information on the low jitter edge of the clock CLK. A D-type flip-flop is a commonly used in the circuit in retiming block RT to retime the signal. The use of the emitter coupled logic (ECL) family allows the retimed jitter to be easily less than 10 ps even with 1000 ps of input jitter. The clock CLK is typically a low-jitter source. Note, however, that retiming circuit 20 is used only to transmit the data channel to the next receiver. In the present invention, the retiming circuit (or its output signal) is replicated to generate the two SPD gating signals, modulator drive signals, and the discriminator gating signals, all synchronized to each other.

In an example embodiment, the timing generator TG is or includes an FPGA operated by a phase-locked loop (PLL) clock CLK, and has an output jitter of about 100 ps root-mean-square (RMS). The clock CLK can be an ECL output that retimes the data from the timing generator with about 3 ps RMS output at the output to the device drivers. In an example embodiment, ECL D-type flip-flops are used in retimer block RT.

It is generally preferred in the present invention to use or otherwise include an FPGA in the timing generator TG because it generates a digital signal output, is fast, and is programmable. Unfortunately, FPGAs have significant jitter in the digital output, which is a problem when using an FPGA for timing applications. An ASIC device has the advantage of being fast, but unfortunately is not programmable. A DSP is generally considered to be too slow to be used as a timing generator for a QKD system.

An FPGA can be used for timing generation if the jitter can be reduced. In the present invention, an ECL logic family (physical interface) is used to reduce the timing jitter in the digital output (shown as signal SF in FIG. 3) from the FPGA by re-clocking on fixed intervals to update the timing output. In an example embodiment of the present invention, this is accomplished by coupling an FPGA to two ECL delays and an ECL-based AND gate that sets the pulse width of each required output signal.

Figure 3:
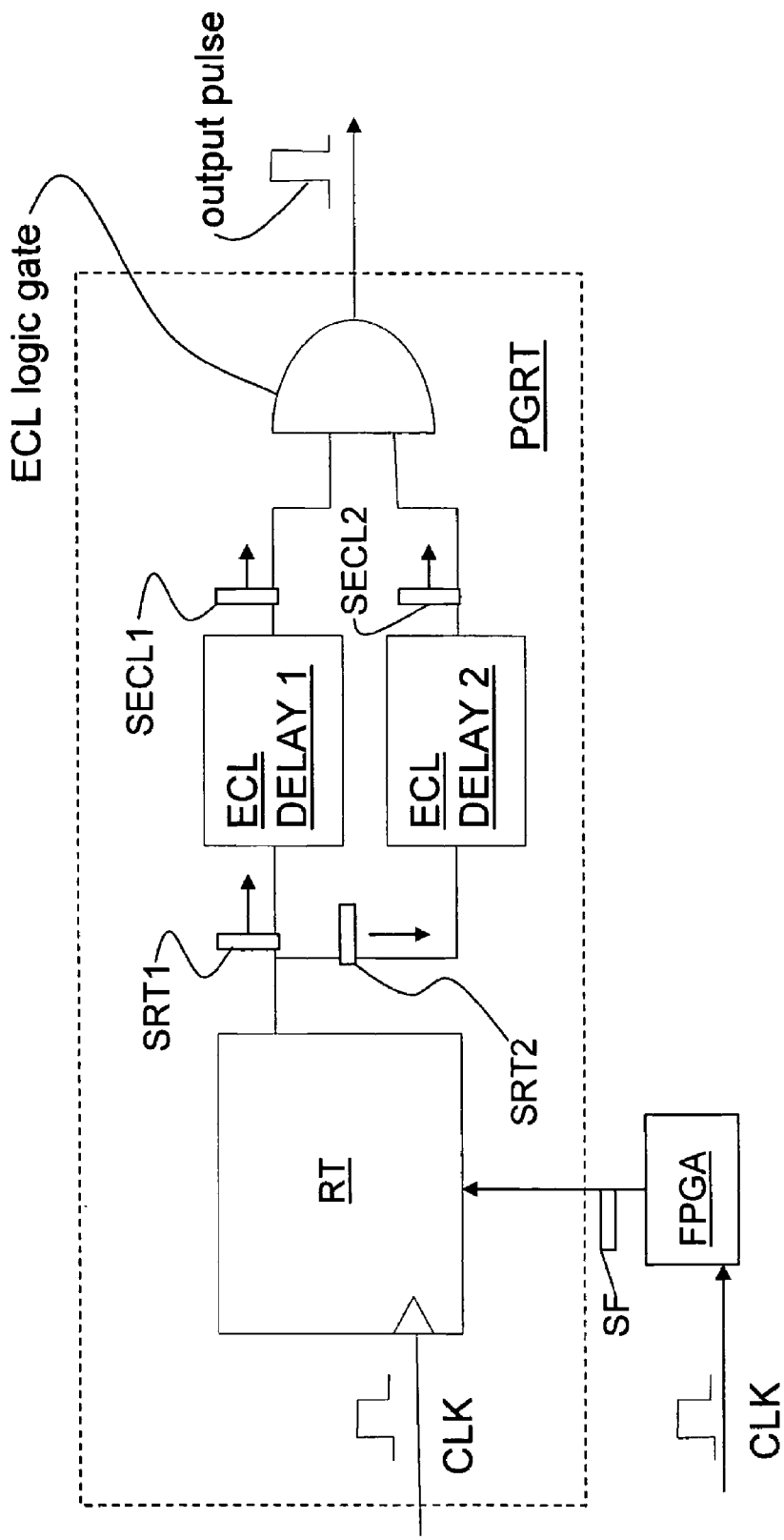
FIG. 3 is a schematic diagram of an example embodiment of a pulse generator with retimer (PRGT) for a single clock domain.

FIG. 3 is a schematic diagram of a pulse generator with retimer (PGRT) according to the above-mentioned example embodiment. The present invention allows for the control of the width of the output pulse. The PGRT of FIG. 3 illustrates a single output for the sake of illustration. In practice, multiple outputs are used (see FIG. 4) to support a corresponding number of output pulses. The PGRT includes a retiming block RT, adapted to receive an input signal and a clock signal CLK, as well as output signals SF from the FPGA (one electrical link between the FPGA and the retiming block is shown for the sake of illustration). Two emitted coupled logic (ECL) delay circuits ("ECL delay 1" and "ECL delay 2") are coupled to retiming block RT via a single electrical connection and are arranged in parallel. The outputs of the ECL delay circuits are coupled to respective inputs of a logic gate.

In the operation of PGRT of FIG. 3, the clock pulse CLK is received by retimer RT and the FPGA. The clock pulse CLK has a constant frequency, e.g., 100 to 200 MHz and serves as a retiming reference. Signal SF from the FPGA is the digital timing pulse associated with the arrival and/or processing of a qubit. Even though the FPGA uses the clock signal CLK to generate digital timing signal SF, the latter will have some jitter (e.g., 100 picoseconds) due to the nature of the FPGA, as described above. Retimer RT receives the FPGA timing signal SF and retimes it based on the clock pulse CLK to remove the jitter. However, this re-timed timing signal requires further processing. In particular, it is usually required that the pulse width and relative delay time be adjusted by small amounts, e.g., by increments on the order of 10 picoseconds.

To adjust the pulse width without introducing any significant jitter, retimer RT creates two identical timing signals SRT1 and SRT2. These signals travel to ECL delay 1 and ECL delay 2, respectively, which are low-jitter logic devices that have an adjustable delay. The ECL delays receive respective signals SRT1 and SRT2 and generate respective output signals SECL1 and SECL2 having the relative delay encoded by the ECL delays. The ECL logic gate compares the two ECL output signals and sets the pulse width of the output signal (pulse) to be that corresponding to the signal overlap at the ECL logic gate. The common delay of ECL delay 1 and ECL delay 2 adds small delay increments to the output signal, allowing placement of the output signal to be finer than the clock signal edge, while maintaining low jitter.

Because the circuit elements following the retimer RT are low-jitter logic elements, the PGRT generates an output timing signal that has a reduced amount of jitter as compared to the prior art timing signals associated with prior art QKD systems 10A and 10B.

Figure 4:
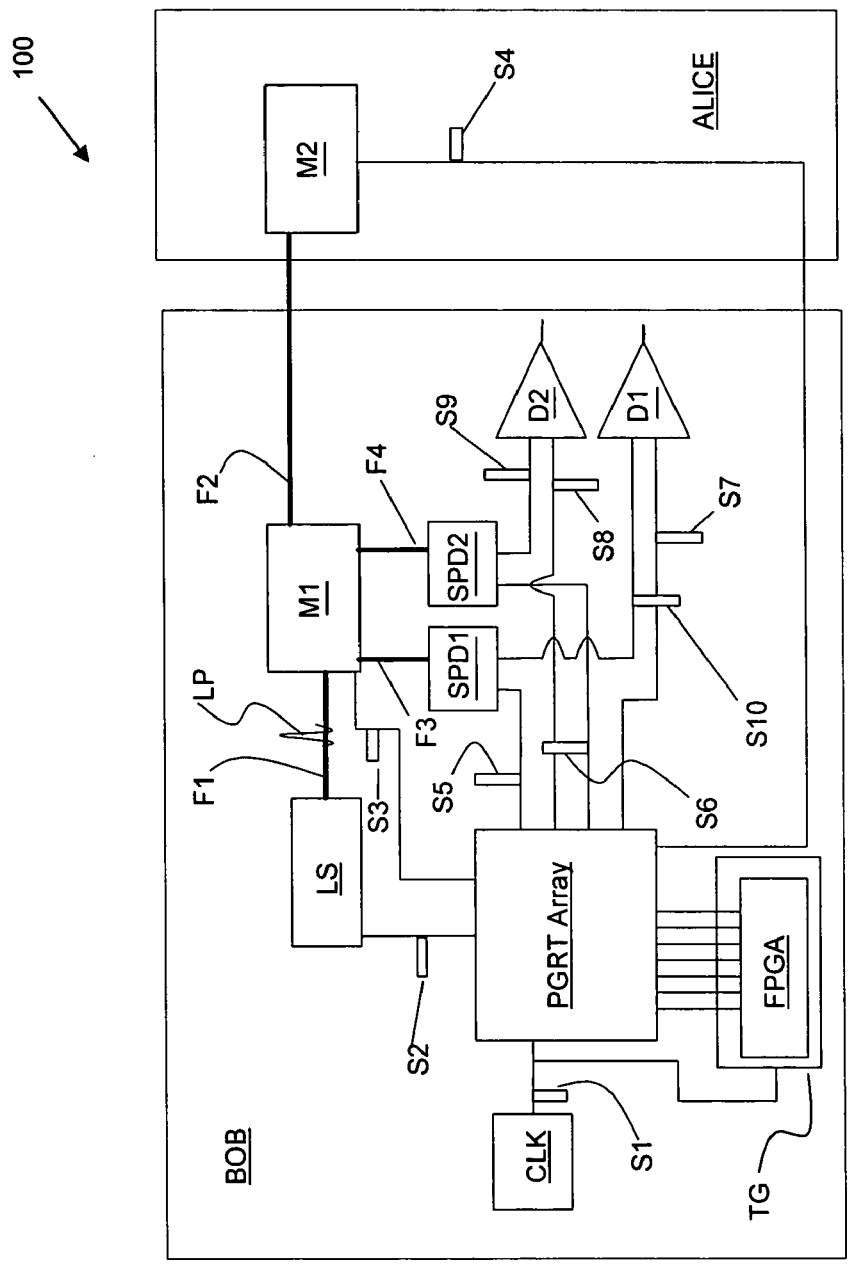
FIG. 4 is a schematic diagram of an example embodiment of the retiming circuit of the present invention that includes the PRGT of the present invention.

FIG. 4 is a schematic diagram of an example embodiment two-way QKD system 100 that reduces or eliminates timing jitter during operation of the QKD system by utilizing a PGRT array that includes one or more PGRTs as shown in FIG. 3, discussed above, as part of the timing system. In the example embodiment of QKD system 100 of FIG. 4, the PGRT array includes seven PGRTs and seven corresponding outputs. The inputs to the PGRTs in the PGRT array are from the FPGA and correspond to the different electrically controlled elements in the QKD system, while the PGRT outputs are coupled to the electrically controlled elements of the QKD system. For example, the PGRT array generates SPD gating pulses S5 and S6, discriminator gating pulses S7 and S8, laser driver pulse S2, and modulator driver pulses S3 and S4, all of which are low-jitter pulses. System 100 has improved repeatability of single-photon-level signal creation and detection due to the reduction in timing error provided by the PGRT.

Figure 5:
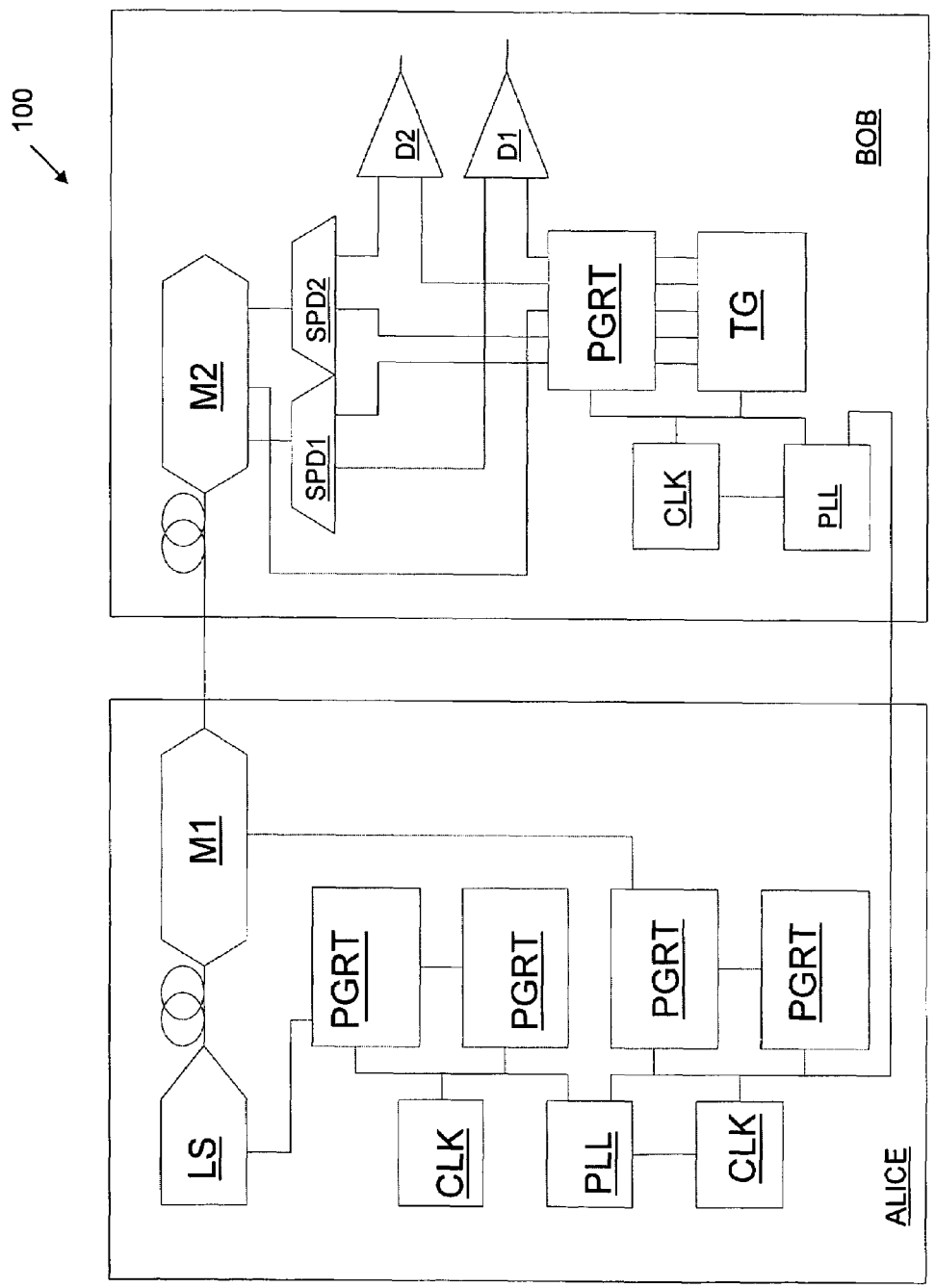
FIG. 5 is a schematic diagram of an example embodiment of a one-way QKD, wherein the timing system includes multiple clock domains each including a PGRT.

FIG. 5 shows a schematic diagram of a QKD system 100 with multiple clock domains with improved timing jitter (i.e., reduced or eliminated timing jitter). The phase locked loops PLL allow the multiple clock domains to act in unison. The clock CLK from one source is transmitted by an optical link to the next part of the system, where the phase locked loop PLL keeps the clock in the subsequent section in lock step. The total system jitter remains low because the phase locked loops PLL keep the jitter between clock domains low, and these low-jitter clocks retime along the whole system. At Alice, four separate PGRTs with single outputs are used, while at Bob, a single PGRT with multiple outputs is used.

There are three major differences between the retiming circuit of the present invention as used for QKD and the prior art retiming circuit of FIG. 2 as designed for use in classical telecommunication applications. The first is that classical telecom receivers use the incoming data to extract the clock signal. However, in QKD systems, the pulses (signals) produced by the laser source are attenuated to levels that are too weak (e.g., one photon or less, on average) for the clock data to be extracted therefrom. Simply put, there is "no rising edge" and "falling edge" of an incoming QKD optical signal—just a binary indication of "yes the signal is there" or "no it is not there," as deduced from the SPDs. Thus, the clock signal needs to be generated by a separate synchronized source.

The second major difference is that the weak photons in QKD result in a very high error rate. This means that even if the data could somehow be extracted from the incoming signal, the error rate is too high (i.e., in the 1% to 10% range) for standard telecom circuits to handle. Most telecom circuits can only handle relatively small error rates, i.e., from about $10^{-15}$ (one part per trillion) to about $10^{-3}$ (0.1%). The high error rate of QKD would cause a standard telecom jitter correction circuit to "give up" because it perceives too many errors, and to jump back and forth without generating the needed feedback signal.

The third major difference is that, opposite to one mutual output, multiple outputs all comply with low jitter requirements and have low time skew relative to one another.

In the timing circuit of the present invention, these differences are accounted for by a PLL clock CLK synchronized to a separate sync optical source that is locked to the QKD signal.

From a larger viewpoint, once the QKD clock signal is redistributed and retimed, it is used separately from the data, while in a standard telecom system, the clock signal is separated and used locally at each step of the way.

The present invention has the following advantages. First, it reduces bit-error rates caused by bad timing; second, it improves repeatability of single photon counts, resulting in better instrument fidelity; third, it improves monotonicity of QKD system scans, which allows for system features such as automatic system turn up and dither control; fourth, it reduces leakage of information cause by correlation of timing to random data values in timing generator; and fifth, it enables the various parts of the QKD system to work together as if with a single timing source, even though there are multiple physically separated timing sources.

The multiple clocking scheme of the present invention allows QKD system to act as a single well-timed machine even though there are different time domains, each separated by the optical signal path that runs between the transmitting and receiving stations (Alice and Bob). It should also be noted that the timing system of the present invention applies to QKD systems, including both "one-way" and "two-way" QKD systems.

Accordingly, there are many other variations and example embodiments that could be set forth to describe the present invention. Thus, the many features and advantages of the present invention are apparent from the detailed specification, and, thus, it is intended by the appended claims to cover all such features and advantages of the described apparatus that follow the true spirit and scope of the invention. In the foregoing Detailed Description, various features are grouped together in various example embodiments for ease of understanding. Furthermore, since numerous modifications and changes will readily occur to those of skill in the art, it is not desired to limit the invention to the exact construction, operation and example embodiments described herein.

What is claimed is:

1. A method of reducing timing error in a quantum key distribution (QKD) system, comprising:
    a) providing with a clock having a periodic clock cycle a clock signal a clock signal period and a clock signal edge to a retimer;
    b) providing a digital timing signal from a programmable circuit to the retimer, wherein the digital timing signal has an amount of jitter;
    c) retiming the digital timing signal in the retimer and generating therefrom first and second retimed output signals;
    d) providing the first and second retimed output signals to respective first and second low-jitter logic delays;
    e) imposing a programmable relative delay to the first and second retimed output signals using the respective first and second delays, with the programmable relative delay being adjustable in increments and covering at least an entire clock signal period; and f) inputting the delayed first and second retimed output signals into an logic gate to form a low-jitter output signal that is selectively positioned finer than the clock signal edge between clock cycle periods, and that has a select signal width as defined by said first and second retimed output signals.

2. The method of claim 1, further including: providing the low-jitter output signal to an electrically controlled element of a QKD system.

3. The method of claim 2, wherein the electrically controlled element is selected from the group of elements comprising: a phase modulator driver, a single-photon detector, a discriminator, and a laser driver.

4. The method of claim 1, further including:
providing multiple digital timing signals from the programmable circuit to the retimer; and
generating in response thereto multiple low-jitter output signals.

5. The method of claim 1, wherein said providing a digital timing signal from a programmable circuit includes generating the digital timing signal using a field-programmable gate array (FPGA).

6. A system for reducing timing error in a quantum key distribution (QKD) system, comprising:
a clock having a periodic clock cycle and that generates a clock signal having a clock signal period and a clock signal edge;
a retimer electrically connected to the clock and adapted to receive the clock signal and retime a timing signal provided thereto;
a programmable circuit operably coupled to the retimer, the programmable circuit adapted to generate the timing signal having an amount of jitter and sending the timing signal to the retimer for retiming;
first and second low-jitter delays operably coupled to the retimer and adapted to receive respective first and second retimed signals from the retimer and impart a programmable relative delay to the first and second retimed signals, with the programmable relative delay being adjustable in increments and covering at least an entire clock signal period; and
a low-jitter logic gate coupled to respective outputs of the first and second delays and adapted to receive the first and second retimed and delayed signals and form therefrom an output pulse having a) less jitter than the amount of jitter in the timing signal generated by the programmable circuit and b) a select position between clock cycle periods and a select pulse width as defined by said first and second retimed output signals, said select position being finer than the clock signal edge.

7. The system of claim 6, further including an electrically controlled element operably coupled to the low-jitter logic gate.

8. The system of claim 7, wherein the electrically controlled element is selected from the group of elements comprising: a phase modulator driver, a single-photon detector, a discriminator, and a laser driver.

9. A pulse-generator with retimer (PGRT) array comprising:
two or more systems according to claim 6 arranged in an array;
wherein the programmable circuit is an field-programmable gate array (FPGA) electrically connected to each system so as to provide said timing signal to each system; and
wherein the array has multiple inputs and multiple outputs.

10. The PGRT array of claim 9, wherein the multiple outputs are electrically connected to a corresponding multiple of electrically controlled elements of a QKD system.

11. The system of claim 6, wherein the programmable circuit is or includes a field-programmable gate array (FPGA).

\* \* \* \* \*